United States Patent
Kennedy (10) Patent No.: US 9,328,997 B2
(45) Date of Patent: May 3, 2016

(54) SIGHT MECHANISM WITH INTEGRATED RANGE FINDER

(71) Applicant: Mickey McArthur Kennedy, Medina, OH (US)

(72) Inventor: Mickey McArthur Kennedy, Medina, OH (US)

( * ) Notice: Subject to any disclaimer, the term of this patent is extended or adjusted under 35 U.S.C. 154(b) by 79 days.

(21) Appl. No.: 14/120,406

(22) Filed: May 19, 2014

(65) Prior Publication Data

US 2015/0330743 A1 Nov. 19, 2015

(51) Int. Cl.
*F41G 1/00* (2006.01)
*F41G 1/473* (2006.01)
*H04N 5/232* (2006.01)
*F41G 1/38* (2006.01)

(52) U.S. Cl.
CPC *F41G 1/473* (2013.01); *F41G 1/38* (2013.01); *H04N 5/232* (2013.01); *H04N 5/23293* (2013.01)

(58) Field of Classification Search
CPC .......................................... F41G 3/06
USPC ............................................. 42/142
See application file for complete search history.

(56) References Cited

U.S. PATENT DOCUMENTS

| | | | | |
|---|---|---|---|---|
| 6,252,706 B1* | 6/2001 | Kaladgew | ................ | F41G 3/06 359/399 |
| 2014/0215876 A1* | 8/2014 | Popa-Simil | ............. | F41C 27/22 42/1.06 |
| 2015/0059567 A1* | 3/2015 | Fox | ........................ | F41A 27/18 89/41.19 |

* cited by examiner

*Primary Examiner* — Samir Abdosh (57) ABSTRACT

The disclosed subject matter relates to a sight device can include an integrated range finder and/or a camera with an associated display device. The display device can present a field of view associated with the target and an aiming element such as a dot or crosshairs. Data associated with a distance to a target can be employed to update a presentation by the display device such that the aiming element accurately represents a location at the distance to the target a projectile is expected to hit upon discharge. Updates to the presentation can relate to, e.g., a zoom factor or a vertical-axis offset determined based on the distance to the target.

4 Claims, 8 Drawing Sheets

SIGHT MECHANISM WITH INTEGRATED RANGE FINDER

CROSS-REFERENCE TO RELATED APPLICATIONS

This application claims the benefit of U.S. Provisional Patent Application Ser. No. 61/959,088 filed on Aug. 15, 2013 and entitled, "SIGHT MECHANISM WITH INTEGRATED RANGE FINDER." The entirety of this application is incorporated herein by reference.

TECHNICAL FIELD

The present application relates generally to a sight mechanism, such as a bow or crossbow sight with an integrated range finder device.

BACKGROUND

In the domain of game hunting or target shooting, there exist countless types of arms, ammunition, and associated sighting devices. In the case of archery-based arms such as bows or crossbows, accurately aiming can be more complicated than otherwise.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

In the domain of game hunting or target shooting, there exist countless types of arms, ammunition, and associated sighting devices. In the case of archery-based arms such as bows or crossbows the velocity of the projected ammunition (e.g., a projectile) such as arrows or crossbow bolts is of relatively low velocity when compared to bullets or other high-velocity ammunition. Due at least in part to this typically lower velocity for arrows or bolts, factors such as distance to the target have more significant effects on the shooter's accuracy and/or ability to hit the target over relatively short distances (e.g., less than about 100 meters) than for higher velocity projectiles. For high velocity projectiles, such effects (e.g., loss of altitude of the projectile due to gravity) are generally not significant until the distance to the target becomes relatively large (e.g., greater than about 1000 meters).

For low velocity ammunition (e.g., arrows, bolts, etc.), small errors (e.g., about 5 meters or less) in estimating the distance to the target can result in a difference between hitting the target and missing. In fact, in the case of archery-based equipment, research indicates that the most often cited reason for missing a target is due to incorrectly estimating the distance to the target.

Range finder devices exist in the market place, which can be used to at least partially remedy certain difficulties of determining the distance to the target. However, conventional solutions are inadequate for several reasons. For example, other solutions typically require additional time, resources, or labor. Generally, a single user cannot concurrently operate a range finder and a bow, so additional preparation time is needed after identifying a target before firing at the target, or another pair of hands or eyes is used (e.g., a "spotter"), one pair to determine the distance and the other pair to aim and shoot.

The disclosed subject matter relates to an aiming device or sight with an integrated range finder. Such can increase the accuracy at hitting a desired target, and can also reduce the time, resources, or effort associated with obtaining accuracy increases. The sight can also be simpler and more intuitive than other solutions, e.g., by removing unnecessarily complex or time-consuming operations typically associated with determining range and aiming; mitigating the complexity of learning and operating previous sights and other equipment, and/or enabling a more consistent and uninterrupted aiming process.

Example Features

The sight device can be mounted to virtually any existing bow, crossbow, or other projectile device.

The sight device can be compatible with virtually any configuration for the projectile device (e.g., draw length, draw weight, handedness, muzzle velocity, initial distance configuration, etc.) and any such configuration data can be employed in connection with other features.

The sight device can include a camera as well as data storage. Photographs or video can be stored. Environments recorded or targeted by the camera can be displayed by an associated display device (e.g., a liquid crystal display (LCD)). The camera and/or display can be configured to support multiple zooming factors, which can be manually adjusted by a user to match the target distance (e.g., determined by the range finder) or automatically adjusted based on the target distance. The display can provide an aiming element (e.g., sight, dot, crosshairs, etc.) as well as an indication of the target distance (e.g., a numeric readout).

The sight device can include computation abilities and can therefore make use of additional data to expand feature sets or improve accuracy. Such data can include, e.g., altitude/elevation data, trajectory data (e.g., initial angle of fire), weather data (e.g., wind speed and direction, pressure, precipitation, etc.), visual recognition data or algorithms (e.g., to aid in targeting or issue warnings relating to safety such as a human or potential inhabited structure in the environment or view), unit conversion data or tables, or scientific principal data.

Example Sight with Integrated Range Finder and Display

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Figure 1:
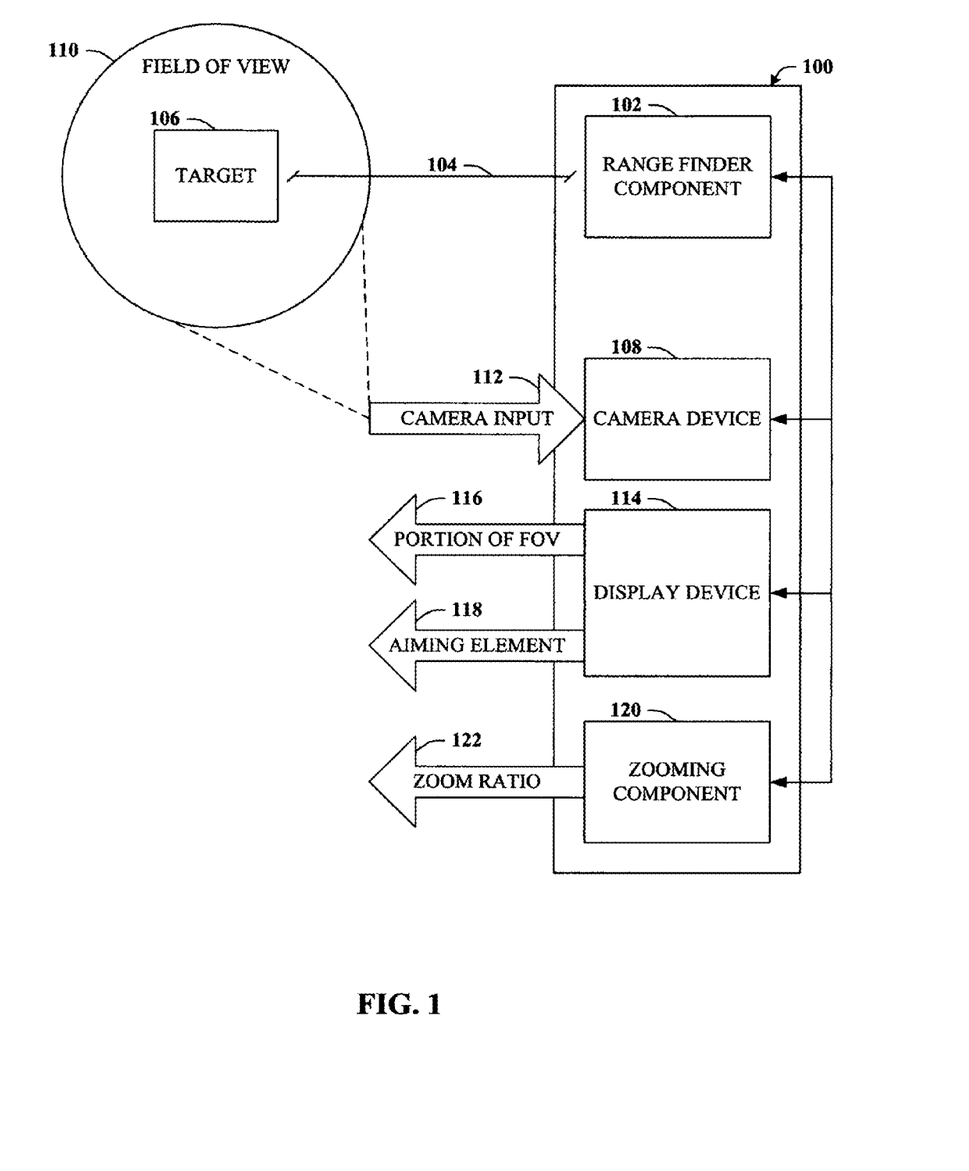
FIG. 1 illustrates a block diagram of an example system that provides a sighting device with integrated range finder and display in accordance with certain embodiments of this disclosure.

Referring now to the drawing, with reference initially to FIG. 1, sighting device 100 is depicted. Device 100 can be an archery-based sighting device such as for a bow or crossbow. Sighting device 100 can include range finder component 102, camera device 108, display device 114, and zooming component 120. Range finder component 102 can be configured to determine distance 104 to target 106, e.g., in connection with hunting or target shooting. Distance 104 can be determined in any suitable units, such as yards, meters, feet, or the like.

Camera device 108 can be configured to receive camera input 112 relating to field of view 110. Field of view 110 represents a view of an environment and generally includes target 106. Typically, camera input 112 will include visible light, however, it is understood that camera input 112 can also relate to electromagnetic radiation (EM) outside of the human-visible spectrum, such as, e.g., infra-red light.

Display device 114 can be configured to display a portion 116 of field of view 110. For example, a portion 116 that includes target 106. Display device 114 can also be configured to present aiming element 118. Aiming element 118 can be configured as a small dot, crosshairs, or any other suitable aiming element.

A goal of virtually all aiming devices is to ensure that sighting components accurately represent the eventual location or point of impact of a discharged projectile or ballistic. Similarly, aiming element 118 is intended to represent a point of impact of the arrow, bolt, or other projectile discharged from a projectile device associated with device 100. Put another way, aiming element 118 can be visual indicia relating to (an expected or determined) trajectory of a projectile at distance 104. As detailed supra, projectiles with relatively low velocities (e.g., arrows, bolts, etc.) suffer from a greater drop in elevation per horizontal unit distance traveled. Accordingly, adjusting for such can be quite significant in the aiming process, particularly for archery-based projectile devices.

Zooming component 120 can be configured to determine zoom ratio 122 for the portion 116 of the field of view 110. Zoom ratio 122 can be determined based on distance 104 as well as based on other data.

In some embodiments, aiming element 118 can be located a defined vertical distance above a centerline of display device 114, which can be initially configured based on a short or proximal distance to a target. The initial configuration can be such that the vertical distance above the centerline fully compensates for the elevation drop of the projectile when traversing the proximal distance.

According to some embodiments, it is noted that after the initial configuration aiming element 118 is configured specifically for the proximal distance. Hence, with no other adjustments, then aiming element 118 will likely not accurately predict a point of impact if the system (e.g., system 100) is moved closer to or farther away from the target. For example, moving farther away from the target than specified by the proximal distance might result in the point of impact being below the location depicted by aiming element 118. Likewise, being closer to the target might result in a point of impact for the projectile that is above the location depicted by aiming element 118.

Thus, zooming component 120 can operate to compensate for virtually any distance away from target 106 based on distance 104 determined by range finger component 102. By scaling the zoom ratio 122 to match distance 104 (or a function of distance 104 less the initial proximal distance configuration), the initial vertical distance above the centerline of display device 114 where aiming element 118 exists can be scaled to accurately map to a different vertical angle of discharge of the projectile. Specifically, an angle of discharge that ensures the point of impact is accurately depicted by aiming element 118.

Figure 2:
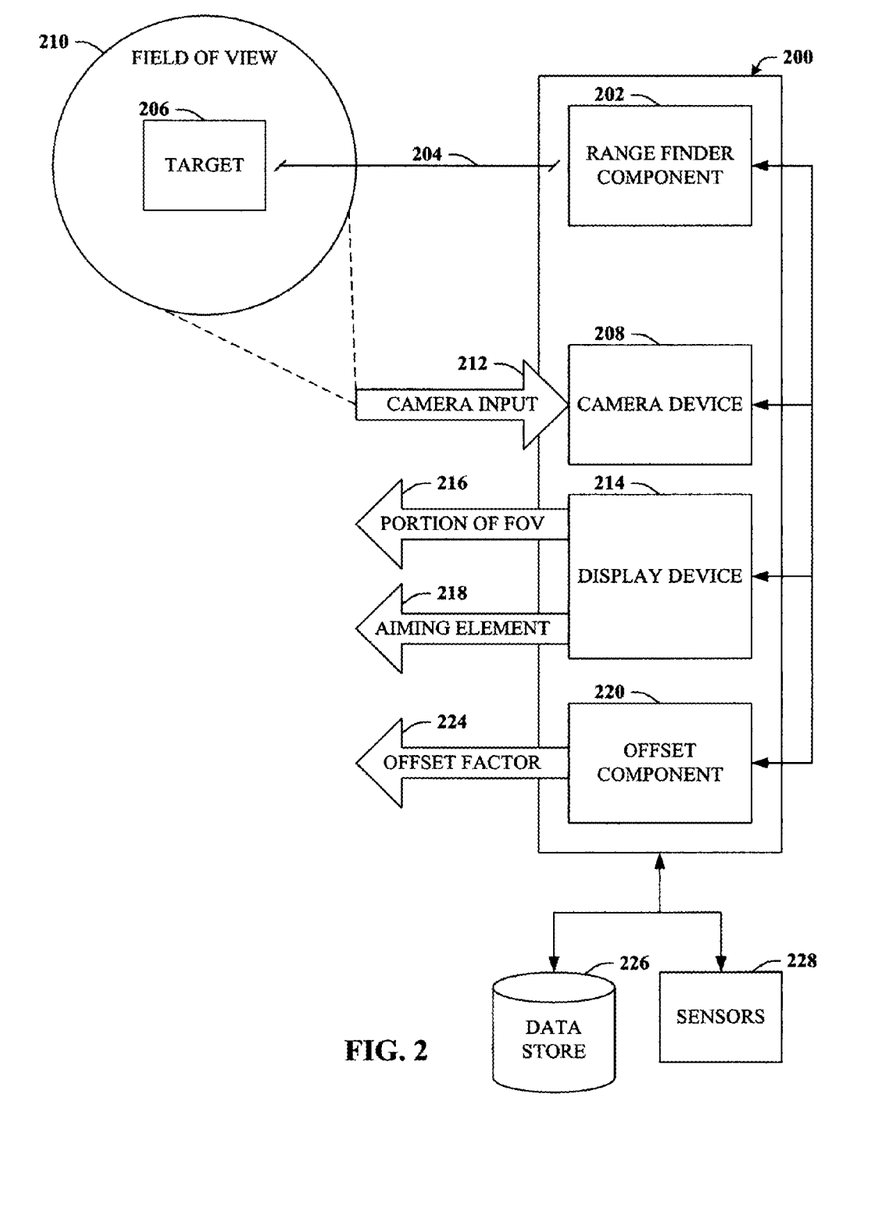
FIG. 2 illustrates a block diagram of an example system that provides a sighting device with integrated range finder and display that pans to offset the distance to the target in accordance with certain embodiments of this disclosure.

Turning now to FIG. 2, system 200 is depicted. System 200 can include all or a portion of devices, components, or other elements detailed in connection with FIG. 1. For example, elements 202-218 can be substantially similar to respective counterpart elements 102-118 detailed in connection with FIG. 1. Additionally or alternatively, system 200 can include offset component 220.

Offset component 220 can be configured to offset portion 216 of field of view 210 displayed by display device 214. Offset component 220 can offset portion 216 along a vertical axis by an offset factor 224 that is a function of distance 204. For example, the image displayed by display device 214 (e.g., portion 216), can be scrolled or panned along the vertical axis (y-axis) as a function of distance 204. Hence, as distance 204 increases, offset factor 224 (e.g., an offset value for screen display coordinates) can increase. Similarly, as distance 204 decreases, offset factor 224 can decrease.

In more detail, consider the scenario in which camera device 208 is parallel to the horizon and the center of an associated lens is focused directly at the center of a target. If distance 204 is increases with no other changes, then the center of the lens is still pointed at the center of the target. However, the image displayed by display device 214 need not be centered based on the center of the lens. Rather, the image displayed can be panned downward (by offset factor 224) such that a lower portion of the target is represented at the center of display device 214.

Such panning can accurately compensate for the expected drop of elevation of a projectile over distance 204. For example, if it is determined that distance 204 is approximately 30 yards and further that a projectile discharged at angle θ with respect to the horizon will drop 6 inches due to gravity during traversal of that 30 yards, then offset factor 224 can represent an offset that accurately compensates for the expected 6-inch loss of elevation. In order to compensate, the image displayed by display device 214 can be panned downward the equivalent of 6 inches. Thus, even though an approximate center of a camera lens might be focused on the target, the approximate center of display device 214 can present the view that is 6 inches below the target, indicating the actual determined point of impact.

In some embodiments, e.g., embodiments associated with FIG. 2, it need not be necessary to position aiming element 218 above a centerline of display device 214 (e.g., the centerline might be favored instead) and likewise, no initial configuration at the proximal distance need be necessary.

It is understood that in some embodiments, system 200 (and system 100) can include or be communicatively coupled to data store 226 and/or sensors 228. Sensors 228 can relate to devices employed to access or measure any suitable physical quantity such as, e.g., wind speed, wind direction, elevation, air pressure, precipitation, firing angle, motion, and so on. Data store 226 can store sensor data as well as configuration data associated with an associated projectile device (e.g., bow, rifle) and various scientific principle data (e.g., gravitational constants, drag coefficients etc.) or unit conversion data. For example, with known quantities such as a draw weight for a bow and certain data associated with an associated arrow, very precise determinations can be made for an expected trajectory of the arrow. This trajectory can, in turn, be used to determine offset factor 224 and/or zoom ratio 122. In some embodiments, data store 226 can store factory specifications for projectile devices and projectiles to enable ready selection by a user. Thus, a user might simply select the type of arm and ammunition being used and associated quantities (e.g., muzzle velocity for that type of ammunition) can be looked up rather than input by the user.

Example Method for Utilizing a Sight with Integrated Range Finder and Display

Figure 3:
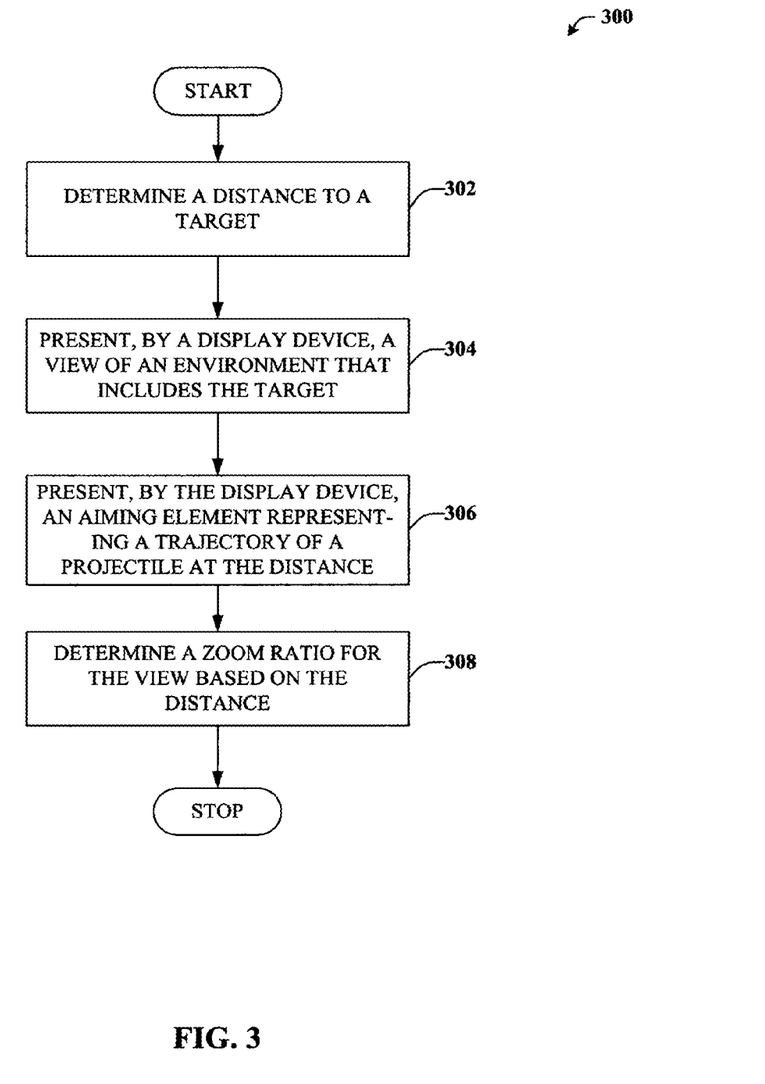
FIG. 3 illustrates an example methodology that can utilize a sight with integrated range finder and display in accordance with certain embodiments of this disclosure.
Figure 4:
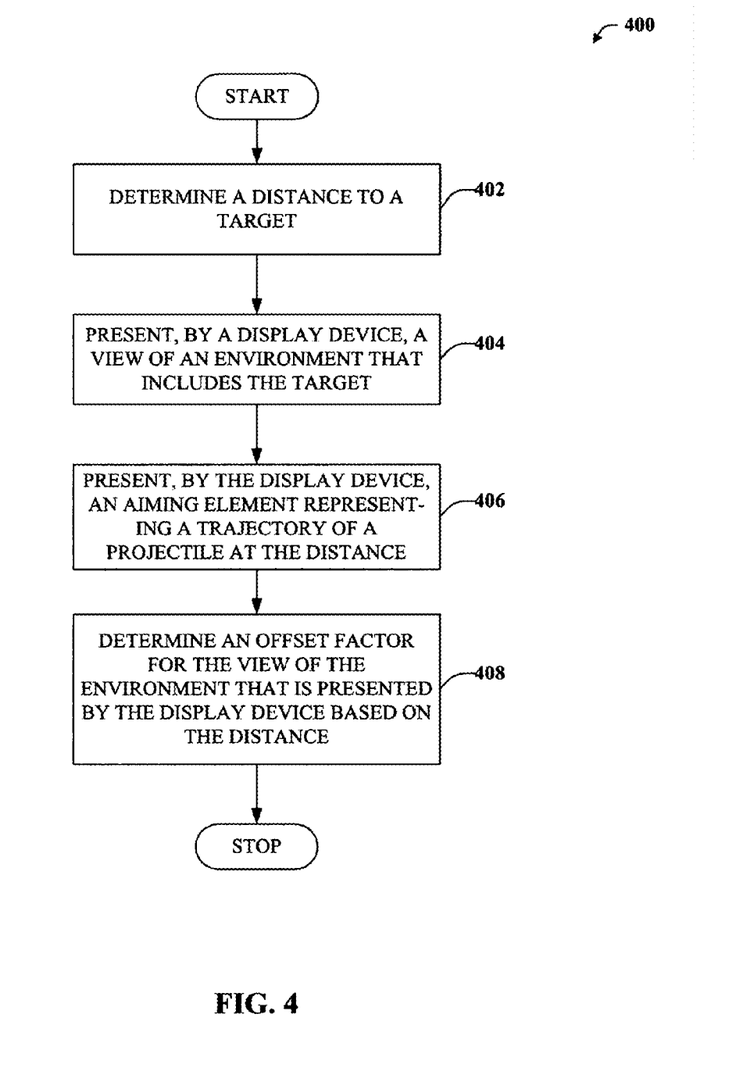
FIG. 4 illustrates an example methodology that can utilize a sight with integrated range finder and display that pans to offset the distance to the target in accordance with certain embodiments of this disclosure.

FIGS. 3 and 4 illustrate methodologies in accordance with the disclosed subject matter. While, for purposes of simplicity of explanation, methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 3, example method 300 for utilizing a sight with integrated range finder and display is provided. In general, at reference numeral 302, a distance to a target can be determined. The distance can be determined by a range finder component or device, and associated distance data can be stored or received.

Next to be described, at reference numeral 304, a view of an environment that includes the target can be presented. The view of the environment can be presented by a display device. At reference numeral 306, an aiming element representing a trajectory of a projectile at the distance can be presented by and/or included in the display device. The aiming element can be a visually distinct dot, crosshairs, or another suitable visual interface element.

At reference numeral 308, a zoom ratio for the view of the environment can be determined based on the distance determined at reference numeral 302. A presentation of the view of the environment can be updated according to the zoom ratio.

Turning now to FIG. 4, example method 400 for utilizing a sight with integrated range finder and display that pans to offset the distance to the target is provided. In general, at reference numeral 402, a distance to a target can be determined. The distance can be determined by a range finder component or device, and associated distance data can be stored or received.

Next to be described, at reference numeral 404, a view of an environment that includes the target can be presented. The view of the environment can be presented by a display device. At reference numeral 406, an aiming element representing a trajectory of a projectile at the distance can be presented by and/or included in the display device. The aiming element can be a visually distinct dot, crosshairs, or another suitable visual interface element.

At reference numeral 408, an offset factor for the view of the environment that is presented by the display at reference numeral 404 can be determined based on the distance determined at reference numeral 402. A presentation of the view of the environment can be updated according to the offset factor. For example, the view presented by the display device can be panned upward such that the aiming element accurately predicts where the projectile will strike at the target distance.

Example System Housing and Rifle Mounting

Figure 5:
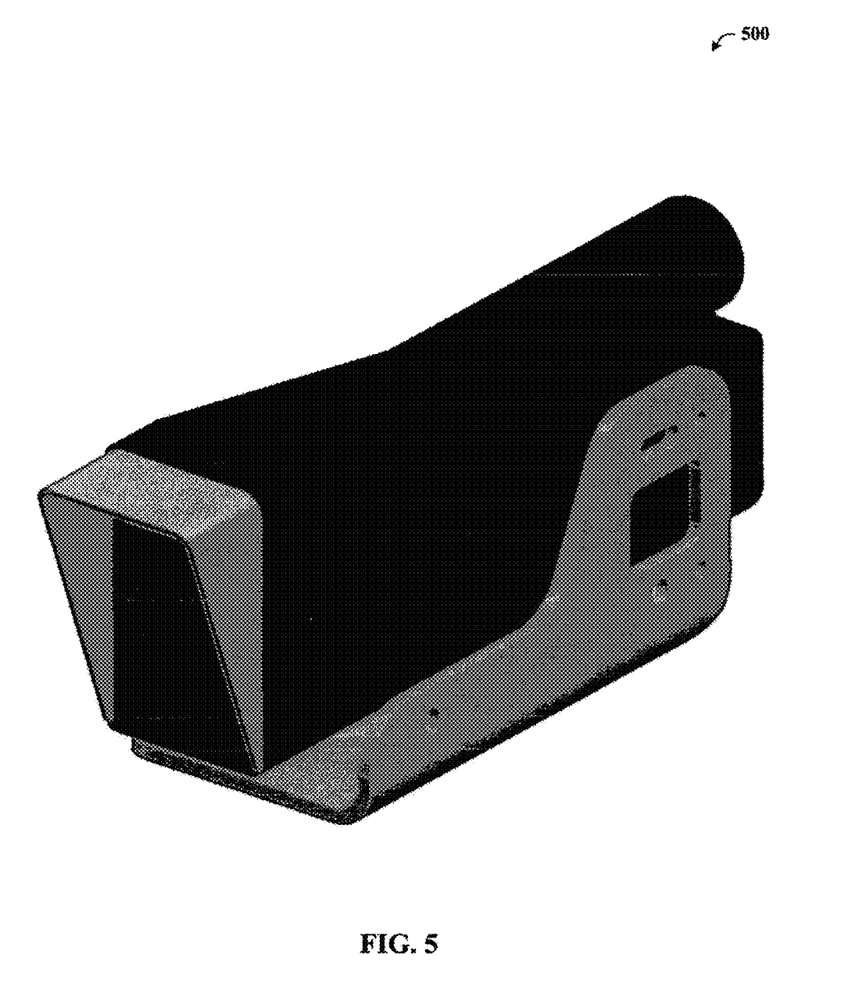
FIG. 5 depicts an illustration of an example housing for a sighting system with an integrated range finder and display in accordance with certain embodiments of this disclosure.

FIG. 5 depicts an illustration of an example housing for a sighting system with an integrated range finder and display. Housing 500 can, for example, include all or portions of system 100 or system 200, or other suitable components or systems. Housing 500 can be readily mounted to a bow or crossbow.

Figure 6:
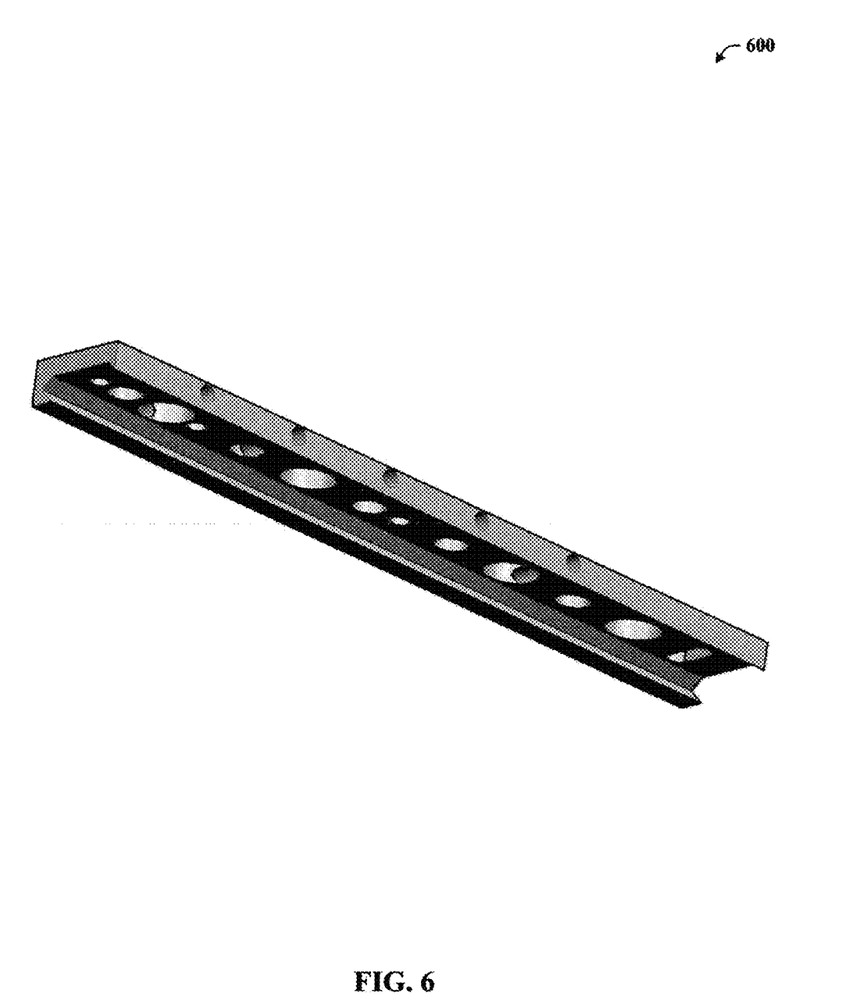
FIG. 6 depicts an illustration of an example rifle mounting bracket for the housing in accordance with certain embodiments of this disclosure.

FIG. 6 depicts an illustration of an example rifle mounting bracket for the housing. While housing 500 can be readily mounted to virtually any bow or crossbow, rifle mounting 600 can be employed to mount housing 500 to a rifle.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 7:
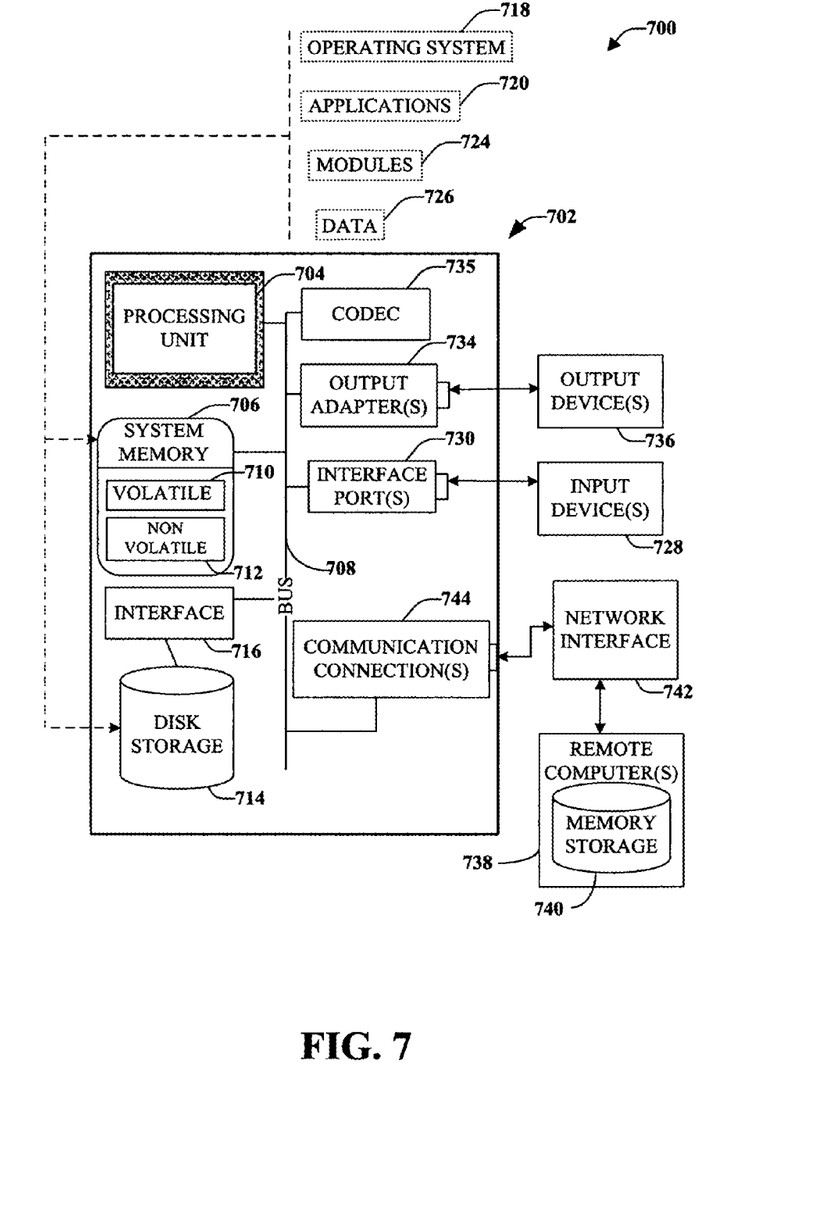
FIG. 7 illustrates an example schematic block diagram for a computing environment in accordance with certain embodiments of this disclosure.

With reference to FIG. 7, a suitable environment 700 for implementing various aspects of the claimed subject matter includes a computer 702. The computer 702 includes a processing unit 704, a system memory 706, a codec 735, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 706 includes volatile memory 710 and non-volatile memory 712. The basic input/output system (BIOS), containing the basic routines to transfer information between elements within the computer 702, such as during start-up, is stored in non-volatile memory 712. In addition, according to present innovations, codec 735 may include at least one of an encoder or decoder, wherein the at least one of an encoder or decoder may consist of hardware, software, or a combination of hardware and software. Although, codec 735 is depicted as a separate component, codec 735 may be contained within non-volatile memory 712 or included in other components detailed herein. By way of illustration, and not limitation, non-volatile memory 712 can include read only memory (ROM), programmable ROM (PROM), electrically programmable ROM (EPROM), electrically erasable programmable ROM (EEPROM), or flash memory. Volatile memory 710 includes random access memory (RAM), which acts as external cache memory. According to present aspects, the volatile memory may store the write operation retry logic (not shown in FIG. 7) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 702 may also include removable/non-removable, volatile/non-volatile computer storage medium. FIG. 7 illustrates, for example, disk storage 714. Disk storage 714 includes, but is not limited to, devices like a magnetic disk drive, solid state disk (SSD) floppy disk drive, tape drive, flash memory card, or memory stick. In addition, disk storage 714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used, such as interface 716. It is appreciated that storage devices 714 can store information related to a user. Such information might be stored at or provided to a server or to an application running on a user device. In one embodiment, the user can be notified (e.g., by way of output device(s) 736) of the types of information that are stored to disk storage 714 and/or transmitted to the server or application. The user can be provided the opportunity to opt-in or opt-out of having such information collected and/or shared with the server or application (e.g., by way of input from input device(s) 728).

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer system 702. Applications 720 take advantage of the management of resources by operating system 718 through program modules 724, and program data 726, such as the boot/shutdown transaction table and the like, stored either in system memory 706 or on disk storage 714. It is to be appreciated that the claimed subject matter can be implemented with various operating systems or combinations of operating systems.

A user enters commands or information into the computer 702 through input device(s) 728. Input devices 728 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s) 728. Thus, for example, a USB port may be used to provide input to computer 702 and to output information from computer 702 to an output device 736. Output adapter 734 is provided to illustrate that there are some output devices 736 like monitors, speakers, and printers, among other output devices 736, which require special adapters. The output adapters 734 include, by way of illustration and not limitation, video and sound cards that provide a means of connection between the output device 736 and the system bus 708. It should be noted that other devices and/or systems of devices provide both input and output capabilities such as remote computer(s) 738.

Computer 702 can operate in a networked environment using logical connections to one or more remote computers, such as remote computer(s) 738. The remote computer(s) 738 can be a personal computer, a server, a router, a network PC, a workstation, a microprocessor based appliance, a peer device, a smart phone, a tablet, or other network node, and typically includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 744 refers to the hardware/software employed to connect the network interface 742 to the bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

Figure 8:
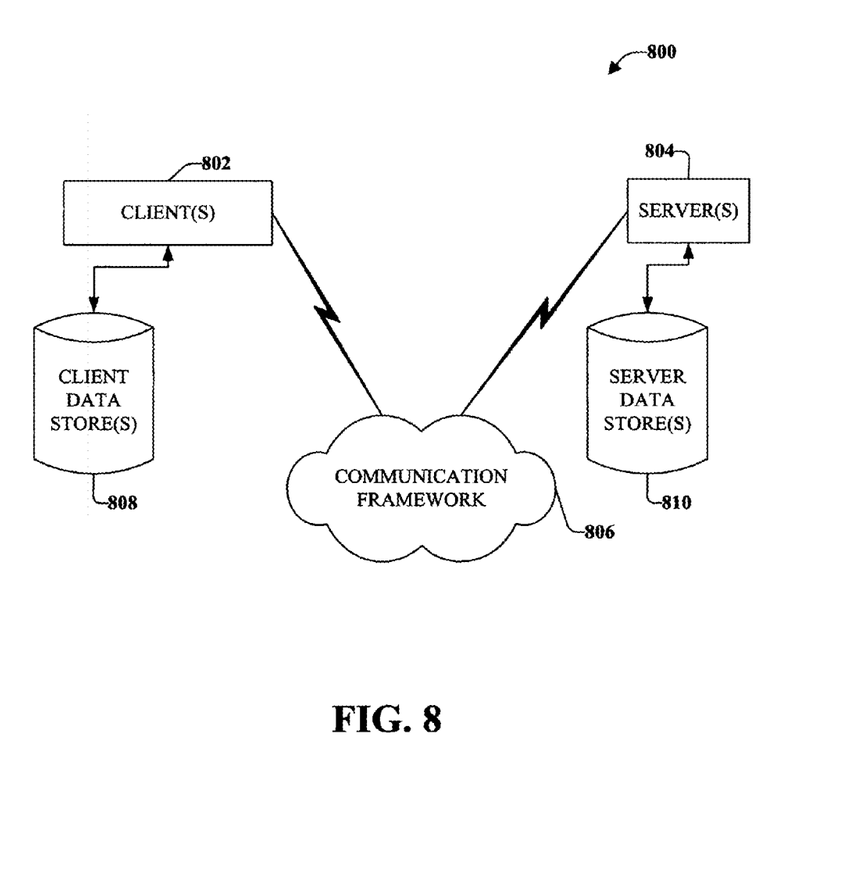
FIG. 8 illustrates an example block diagram of a computer operable to execute certain embodiments of this disclosure.

Referring now to FIG. 8, there is illustrated a schematic block diagram of a computing environment 800 in accordance with this specification. The system 800 includes one or more client(s) 802 (e.g., laptops, smart phones, PDAs, media players, computers, portable electronic devices, tablets, and the like). The client(s) 802 can be hardware and/or software (e.g., threads, processes, computing devices). The system 800 also includes one or more server(s) 804. The server(s) 804 can also be hardware or hardware in combination with software (e.g., threads, processes, computing devices). The servers 804 can house threads to perform transformations by employing aspects of this disclosure, for example. One possible communication between a client 802 and a server 804 can be in the form of a data packet transmitted between two or more computer processes wherein the data packet may include video data. The data packet can include a cookie and/or associated contextual information, for example. The system 800 includes a communication framework 806 (e.g., a global communication network such as the Internet, or mobile network(s)) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

In one embodiment, a client 802 can transfer an encoded file, in accordance with the disclosed subject matter, to server 804. Server 804 can store the file, decode the file, or transmit the file to another client 802. It is to be appreciated, that a client 802 can also transfer uncompressed file to a server 804 and server 804 can compress the file in accordance with the disclosed subject matter. Likewise, server 804 can encode video information and transmit the information via communication framework 806 to one or more clients 802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A sighting device, comprising:
   a range finder component configured to determine a distance to a target;
   a camera device configured to receive camera input relating to a field of view that includes the target;
   a display device configured to display a portion of the field of view that includes the target, and to present an aiming element associated with a trajectory of a projectile at the distance to the target; and
   a zooming component configured to determine a zoom ratio for the portion of the field of view that is displayed by the display device based on the distance to the target determined by the range finder component,
   wherein the display device displays the target according to the zoom ratio determined by the zooming component.

2. The sighting device of claim 1, wherein the aiming element is located a defined vertical distance above a centerline of the display device.

3. The sighting device of claim 2, wherein the defined vertical distance is a function of at least one of: a configuration of bow or another projectile device associated with the sighting device, data relating to a preference of a user of the bow or the other projectile device, or data relating to a sighting or other testing procedures.

4. A method for aiming a projectile device, comprising:
   employing a computer-based processor to execute instructions stored in a memory to perform operations, comprising:
   determining a distance to a target;
   presenting, by a display device, a view of an environment that includes the target;
   presenting an aiming element representing a trajectory of a projectile at the distance to the target; and
   determining a zoom ratio for the view based on the distance,
   wherein the display device displays the target according to the zoom ratio determined by the zooming component.

\* \* \* \* \*